United States Patent [19]

Chin

[11] Patent Number: 4,905,934
[45] Date of Patent: Mar. 6, 1990

[54] UNIVERSAL-TYPE GUST ALLEVIATION SYSTEM FOR AIRCRAFT

[75] Inventor: Jimmie Chin, Flushing, N.Y.

[73] Assignee: Grumman Aerospace Corporation, Bethpage, N.Y.

[21] Appl. No.: 215,326

[22] Filed: Jul. 5, 1988

[51] Int. Cl.⁴ ............................................. B64C 13/16
[52] U.S. Cl. .................................. 244/76 C; 244/191
[58] Field of Search .................. 244/76 C, 76 R, 191, 244/17.13

[56] References Cited

U.S. PATENT DOCUMENTS

| | | | |
|---|---|---|---|
| 3,215,374 | 11/1965 | Olshausen | 244/76 C |
| 3,236,478 | 2/1966 | Adams et al. | 244/76 R |
| 3,240,447 | 3/1966 | Olshausen | 244/76 C |
| 3,520,499 | 7/1970 | Ask | 244/17.13 |
| 4,213,584 | 7/1980 | Tefft et al. | 244/17.13 |

Primary Examiner—Joseph F. Peters, Jr.
Assistant Examiner—Anne Sartelle
Attorney, Agent, or Firm—Richard G. Geib

[57] ABSTRACT

The gust alleviation system was designed to be an add-on to any existing g-command flight control system. The system assumes that there already exists, a stability augmentation system which will hold the aircraft's attitude. This system minimizes the interaction of the gust alleviation system with the existing flight control system. The gust alleviation system picks off the stick displacement signal and the aircraft normal acceleration sensor signal and processes this information. The outputs of the gust alleviation system are added back respectively to the existing flap command signal and the aircraft's original stability augmentation loop.

2 Claims, 1 Drawing Sheet

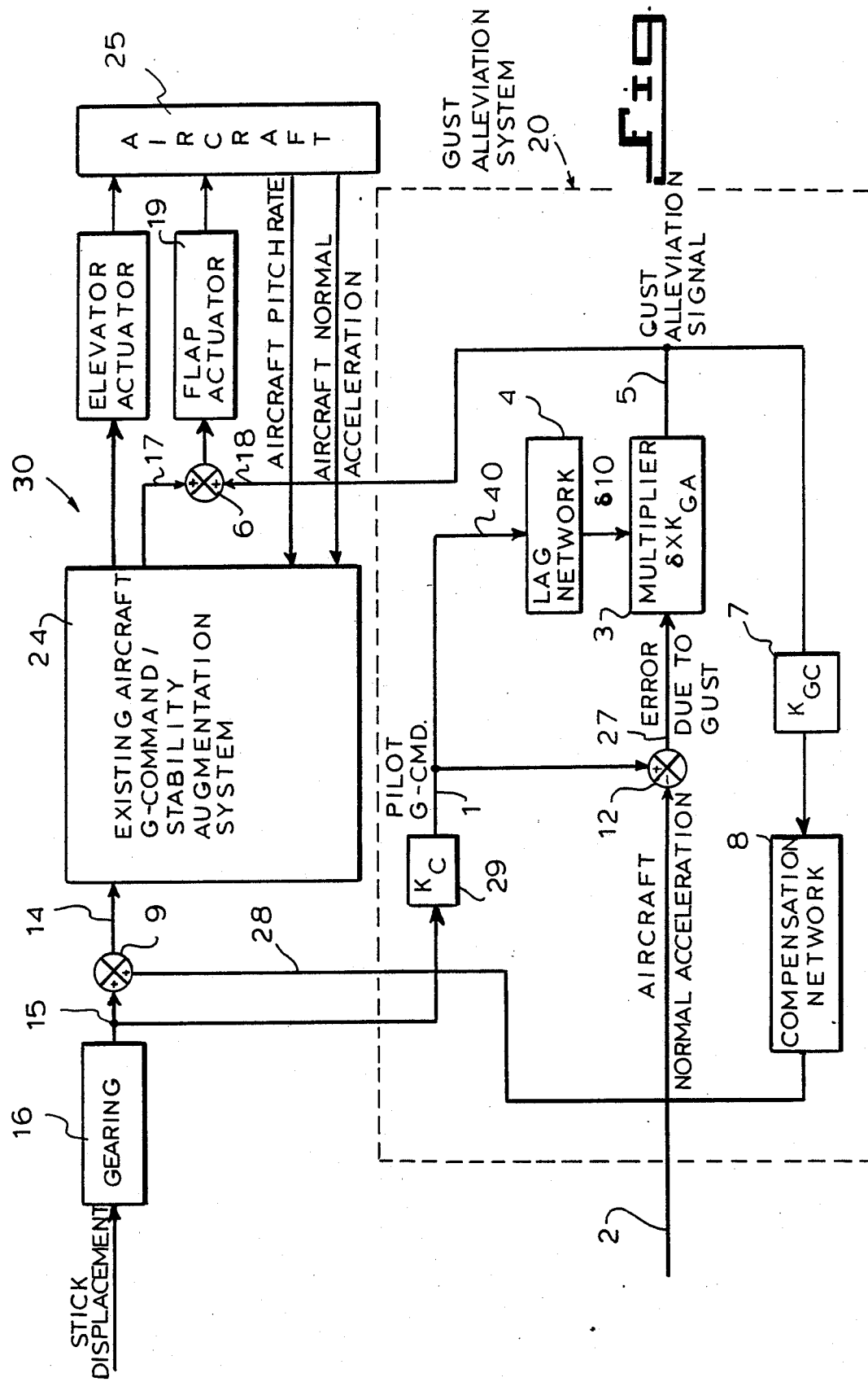

UNIVERSAL-TYPE GUST ALLEVIATION SYSTEM FOR AIRCRAFT

FIELD OF THE INVENTION

The invention features a gust alleviation system which can be used on a universal basis for a wide variety of aircraft control systems having existing G-command/stability augmentation circuitry, and more particularly to a gust alleviation system which is not operative during pilot command activity.

BACKGROUND OF THE INVENTION

Gust alleviation is a well-known method within the aircraft industry. Gust alleviation devices sense atmospheric perturbations and regulate the response of the aircraft accordingly.

It has been known to disable such devices during pilot induced accelerations.

Such teachings are illustrated in U.S. Pat. No. 3,236,478, issued to Adams et al on Feb. 22, 1966.

While the aforementioned concepts are generally simple in nature, their application to hardware has been anything but simple to implement.

Most such systems are extremely complex and intricate.

What even compounds the problem further is that every aircraft control system has to be designed specifically to alleviate gusts. Therefore, it is not always possible to adapt prior art gust alleviation systems with newer aircraft.

The present invention has developed a very simple gust alleviation system which is easily adaptable to most aircraft control systems utilizing standard, off-the-shelf circuitry.

The invention features a universal-type gust alleviation system which can be tailored to different aircraft control systems with a minimum of adjustment.

The inventive concept has found that most current systems comprise G-command/stability augmentation controls. Using these in-place systems, the subject invention can be easily implemented, wherein gust alleviation signals from the inventive circuitry can be added with minimum adjustment to existing flap command signals and stability augmentation loops.

BRIEF SUMMARY OF THE INVENTION

The invention relates to a universal-type gust alleviation system that can be tailored to different aircraft control systems with a minimum of adjustment. The system comprises an estimation means for measuring pilot command stick displacement as a function of steady state commanded normal acceleration, and which provides an estimation signal therefor.

A differential means obtains the difference between the estimated signal and a signal representing the actual aircraft acceleration, and provides a difference signal. The difference signal, which is a measure of gust alleviation is then fed to a control system of the aircraft in order to compensate for atmospheric perturbations.

A weighting means, which includes a lag network, zeroes the differential signal during pilot command activity or alternatively, weights the differential signal with a value approaching unity as the pilot command activity decreases.

The differential signal is added directly to the flap command signal and the stability augmentation loop of the aircraft.

A compensation network is operatively disposed between the stability augmentation loop and the differential means for controlling the attitude of the aircraft.

It is an object of this invention to provide a simplified gust alleviation system that can be easily implemented with minimum adjustment to a wide variety of aircraft control systems.

It is another object of the invention to provide a gust alleviation system that can be fabricated with standard, off-the-shelf componentry.

These and other objects of this invention will be better understood and will become more apparent with reference to the subsequent detailed description considered in conjunction with the accompanying drawing.

BRIEF DESCRIPTION OF THE DRAWING

The FIGURE illustrates in block diagram the gust alleviation system of the invention and its adaption to an aircraft control system having an existing G-command/stability augmentation system.

DETAILED DESCRIPTION OF THE INVENTION

Generally speaking, the invention features a gust alleviation system for aircraft which is easily adaptable to a number of aircraft control systems having existing G-command/stability augmentation.

Referring to the FIGURE, the gust alleviation system of this invention is shown in block diagram within box 20.

The gust alleviation system 20 operatively couples to an aircraft system 30, taking its input from pilot command signal 15, and providing two output signals to adders 9 and 6.

Adder 6 introduces a gust alleviation signal 18 to the flap actuator control signal 17, which actuates the flap actuator 19 of aircraft 25.

Adder 9 combines a gust alleviation signal 28 with the pilot command signal 15 to provide an aircraft pitch signal 14 to the existing aircraft G-command/stability augmentation system 24.

The gust alleviation system 20, estimates the steady state commanded normal acceleration based upon pilot command signal 15, which is obtained from the stick displacement gearing 16.

The signal 15 is used as a reference and is compared to the aircraft's actual, normal acceleration signal 2. The signal 15 passes through a gain filter 29, to become signal 1 which is combined (differenced) with signal 2 at adder 12. The output 27 is the error signal due to gust and atmospheric perturbations. This error signal 27 is passed through multiplier 3, which is a product of a gain $K_{GA}$, and the output 10 ($\delta$) of lag network 4, which also receives signal 1 over line 40.

The pilot command input signal 1 to lag network 4 provides a zero value for $\delta$ during active pilot command inputs, and a value which approaches unity as the pilot command activity decreases.

The gust alleviation signal 5 downstream of the multiplier 3 is thus suppressed during this period, but is activated following the pilot command activity.

The output 5 from the multiplier 3, representing the gust alleviation signal is added to the existing flap command signal 17 at adder 6 to bias the flap (flap actuator 19) and hence control the lift of the aircraft 25 to reduce the normal acceleration due to gust. The signal 5 is also passed through a gain ($K_{GC}$) 7, a compensation network 8 and back to the existing stability loop adder 9 to control the attitude of the aircraft 25.

The system 20 was designed to be an add-on to any existing g-command flight control system. The system assumes that there already exists a stability augmentation system 24 which will hold the aircraft's attitude. This system minimizes the interaction of gust alleviation system with the existing flight control system. The gust alleviation system picks off the stick displacement signal 15 and the aircraft normal acceleration sensor signal 2 and processes this information. The outputs of the gust alleviation system are added back respectively to the existing flap command signal 17 and the aircraft's original stability augmentation loop.

Having thus described the invention what is desired to be protected by Letters Patent is presented by the subsequently appended claims.

What is claimed is:

1. A universal-type gust alleviation system that can be tailored to different aircraft control systems with a minimum of adjustment, comprising:
    estimation means for measuring pilot command stick displacement as a function of steady state commanded normal acceleration, and providing an estimated signal therefor;
    differential means operatively connected to said estimation means for obtaining the difference between an actual aircraft acceleration signal and said estimated acceleration signal, and providing a differential signal which is a measure of gust alleviation;
    means of feeding said differential signal to a control system of an aircraft in order to compensate for atmospheric perturbations;
    weighting means for alternatively zeroing said differential signal during pilot command activity, or otherwise weighting said differential signal with a value which approaches unity as said pilot command activity decreases, said weighing means including a lag network; and
    means for adding said differential signal respectively to an existing flap command signal and to a stability augmentation loop of said aircraft.

2. The universal type gust alleviation system of claim 1, further comprising a compensation network operatively disposed between said stability augmentation loop and said differential means for controlling the attitude of said aircraft.

* * * * *